US010316880B2

(12) United States Patent
Klein et al.

(10) Patent No.: US 10,316,880 B2
(45) Date of Patent: Jun. 11, 2019

(54) CLIP FOR FASTENING COVERINGS TO A VEHICLE BODY

(71) Applicant: FORD GLOBAL TECHNOLOGIES, LLC, Dearborn, MI (US)

(72) Inventors: Florian Klein, Cologne (DE); Volker Krolzig, Pulheim (DE); Manoj Gangal, Pune (IN); Mehmet Sahin, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 14/884,875

(22) Filed: Oct. 16, 2015

(65) Prior Publication Data

US 2016/0114738 A1 Apr. 28, 2016

(30) Foreign Application Priority Data

Oct. 28, 2014 (DE) ................. 10 2014 221 927

(51) Int. Cl.
| | | |
|---|---|---|
| *F16B 21/08* | (2006.01) | |
| *B60R 13/02* | (2006.01) | |
| *F16B 5/06* | (2006.01) | |
| *F16B 19/00* | (2006.01) | |

(52) U.S. Cl.
CPC ........ *F16B 21/084* (2013.01); *B60R 13/0206* (2013.01); *F16B 5/065* (2013.01); *F16B 19/004* (2013.01)

(58) Field of Classification Search
CPC ...... F16B 21/084; F16B 19/004; Y10T 24/30; Y10T 24/303; Y10T 24/309; Y10T 24/42; F15B 5/065

USPC .................................. 411/510, 519
See application file for complete search history.

(56) References Cited

U.S. PATENT DOCUMENTS

| | | | | |
|---|---|---|---|---|
| 4,395,174 A | * | 7/1983 | Freeman ................. | F16B 15/06 411/387.1 |
| 4,568,215 A | * | 2/1986 | Nelson ................ | B29C 65/0672 24/297 |
| 5,393,185 A | * | 2/1995 | Duffy, Jr. .............. | F16B 21/084 411/510 |

(Continued)

FOREIGN PATENT DOCUMENTS

| | | |
|---|---|---|
| DE | 10044727 A1 | 5/2001 |
| FR | 2886691 A1 | 12/2006 |

OTHER PUBLICATIONS

English machine translation of DE10044727A1.

(Continued)

*Primary Examiner* — Abigail E Troy
(74) *Attorney, Agent, or Firm* — Vichit Chea; King & Schickli, PLLC

(57) ABSTRACT

A fastening clip for fastening coverings to body parts of a motor vehicle is provided. The fastening clip comprises a one-piece plastic part with a fastening foot for pressing into an opening provided in the respective body part, a supporting shaft adjoining the fastening foot and intended for receiving the covering by laterally pushing on a holding part provided on the covering, and a holding plate seated on the outer end of the supporting shaft. In order to improve and facilitate mounting, elastic ribs are provided on the periphery of the supporting shaft.

7 Claims, 2 Drawing Sheets

(56) References Cited

U.S. PATENT DOCUMENTS

| | | | | |
|---|---|---|---|---|
| 6,351,380 | B1* | 2/2002 | Curlee | F16B 5/065 |
| | | | | 165/80.3 |
| 6,719,513 | B1* | 4/2004 | Moutousis | F16B 21/084 |
| | | | | 411/510 |
| 6,974,292 | B2* | 12/2005 | Hansen | F16B 21/086 |
| | | | | 24/458 |
| 7,257,870 | B2* | 8/2007 | Deas | H05K 7/142 |
| | | | | 24/297 |
| 7,481,474 | B2* | 1/2009 | Higgins | F16B 21/086 |
| | | | | 24/292 |
| 7,770,266 | B2* | 8/2010 | Higgins | F16B 21/086 |
| | | | | 24/297 |
| 2004/0052612 | A1* | 3/2004 | Miura | F16B 19/004 |
| | | | | 411/508 |
| 2009/0188086 | A1 | 7/2009 | Okada et al. | |

OTHER PUBLICATIONS

English machine translation of FR2886691A1.
Translation of Notification of First Office Action dated Jul. 2, 2018 for CN Application No. 2015106728816 filed Oct. 16, 2015.

\* cited by examiner

CLIP FOR FASTENING COVERINGS TO A VEHICLE BODY

TECHNICAL FIELD

This document relates generally the motor vehicle equipment field and, more specifically, to a clip for fastening coverings to a motor vehicle body. That clip comprises a one-piece plastic part with a fastening foot for pressing into an opening provided in the respective body part, a supporting shaft adjoining the fastening foot and intended for receiving the covering by laterally pushing on a holding part provided on the covering, and a holding plate seated on the outer end of the supporting shaft.

BACKGROUND

The mounting of inner and outer coverings of a vehicle body frequently presents problems since it is difficult to exactly position the clips relative to the holding parts, also referred to as "doghouses" in specialist circles. Therefore, in the case of known assemblies, relatively large tolerances between the supporting shaft of the respective clip and the inner wall of the respective holding part of the covering are provided, as is known, for example, from DE 100 44 727 A1.

If the clips are already inserted before final mounting into the holding parts of the coverings, they are seated relatively loosely and can easily fall out of the holding parts during mounting of the covering or can slide out of the nominal position through the action of forces, which is particularly the case when they are subjected to robust handling. On the other hand, however, the generous tolerances are required so that the clips can be appropriately pressed into the openings provided in the body parts.

SUMMARY

The object on which the invention is based is to facilitate the mounting of inner and outer coverings of a vehicle body.

According to the invention, this object is achieved in that elastic ribs are provided on the periphery of the supporting shaft of the respective clip.

The elastic ribs allow good seating of the clips in the holding parts (doghouses) of the coverings and, moreover, nevertheless permit movement or play of the clips relative to the respective holding part.

The ribs are preferably chosen to be at least long enough to extend as far as the inner wall of the respective holding part. As a result, relatively stable seating between the clips and the holding parts is ensured without having to dispense with the required relative displacements between the holding parts and the clips. Here, the ribs can lie free, abutting or else extend behind the inner wall of the holding part.

The elastic ribs can be readily integrally formed on the supporting shaft of the clip designed as a plastic part. As a result, manufacture is relatively simple, and the elastic ribs are always connected to the clip.

In a preferred embodiment of the invention, the elastic ribs project radially from the peripheral surface of the supporting shaft. When relative movements occur between the respective holding part and the clip, or when lateral displacements occur, the elastic ribs are bent, thereby ensuring sufficient play during mounting.

Two or more ribs can be provided on the peripheral surface of the respective supporting shaft so that good seating of the clip in the holding part is ensured.

Three ribs which are each arranged offset by 120° with respect to one another or else four ribs which are each offset by 90° with respect to one another are expediently provided on the peripheral surface of the supporting shaft.

The fastening foot of the respective clip can be directly adjoined by a spring plate whose inclined edge, in the fastened state of the clip, bears, to be precise preferably with a certain prestress, against the region of the body part that surrounds the respective opening.

It is thereby ensured that the respective clip is firmly seated in the opening assigned to it.

A spacer attachment is expediently provided on the supporting shaft between the spring plate and the outer holding plate, the region of the supporting shaft between the spring plate and the spacer attachment being intended to serve for receiving the holding part of the covering. This makes it possible to ensure that the covering is positioned at a predetermined distance from the respective body part.

The invention is suitable both for fastening inner coverings such as headliners, side wall trim panels, etc. in the interior of the vehicle and for fastening outer coverings such as spoilers, wind deflectors, etc. to the outer side of the body. The openings in body parts can be formed to be round or in some other way as desired in order to be able to receive the fastening foot. The invention is furthermore suitable for fastening coverings to body parts composed of metal sheets and also to plastic body parts.

In the following description, there are shown and described several preferred embodiments of the fastening clip. As should be realized, the fastening clip is capable of other, different embodiments and its several details are capable of modification in various, obvious aspects all without departing from the fastening clip as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification illustrate several aspects of the fastening clip and together with the description serve to explain certain principles thereof.

Reference will now be made in detail to the present preferred embodiments of the fastening clip, examples of which are illustrated in the accompanying drawing figures.

DETAILED DESCRIPTION

Figure 1:
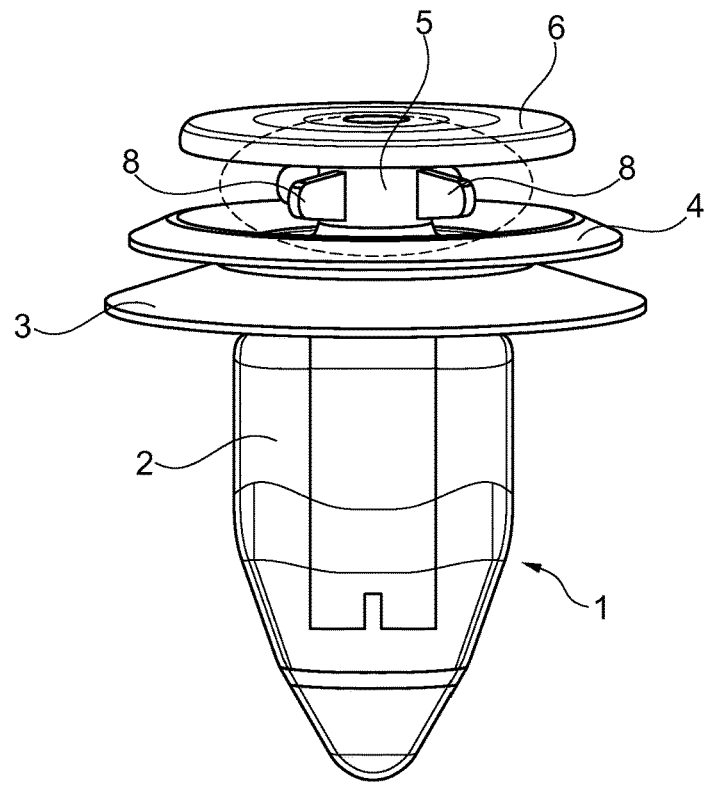
FIG. 1 is a perspective drawing illustrating the preferred embodiment of the fastening clip.

Reference is now made to FIG. 1, showing the fastening clip 1 that is the subject matter of this document. The fastening clip 1 comprises a fastening foot 2, a spring plate 3 adjoining the fastening foot 2, a spacer attachment 4 arranged at a distance from the spring plate 3, a supporting shaft 5 and an outer holding plate 6.

Figure 2:
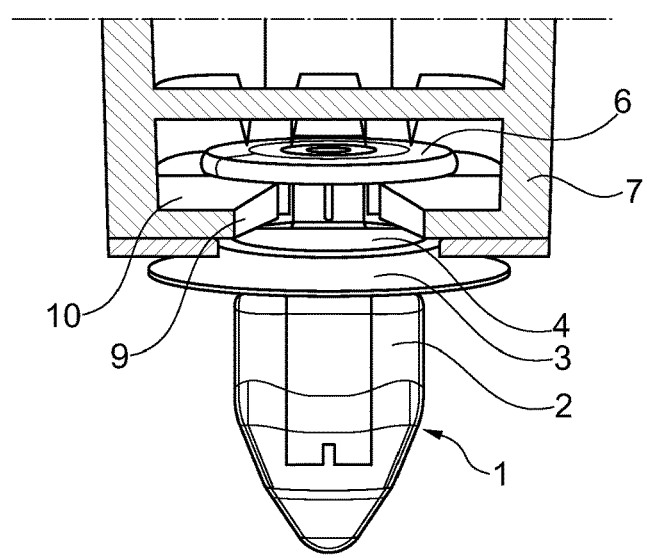
FIG. 2 is a perspective drawing illustrating the fastening clip in combination with a corresponding holding part of the covering.

As illustrated in FIG. 2, the supporting shaft 5 serves to receive a holding part 7 which is fastened to the covering (not shown).

As illustrated in FIG. 1, the supporting shaft 5 of the fastening clip 1 is provided with four spring ribs 8 which are each arranged offset by 90° with respect to one another and are integrally connected to the supporting shaft 5. The spring ribs 8 can be bent easily and serve to center the fastening clip 1 relative to the respective holding part 7 of the covering.

An insertion gap 9 provided on the holding part 7 serves to mount the holding part 7 on the supporting shaft 5 of the fastening clip 1. A portion 10 of the holding part 7 is designed to be flat and to fit precisely between the outer holding plate 6 and the spacer attachment 4.

Figure 3:
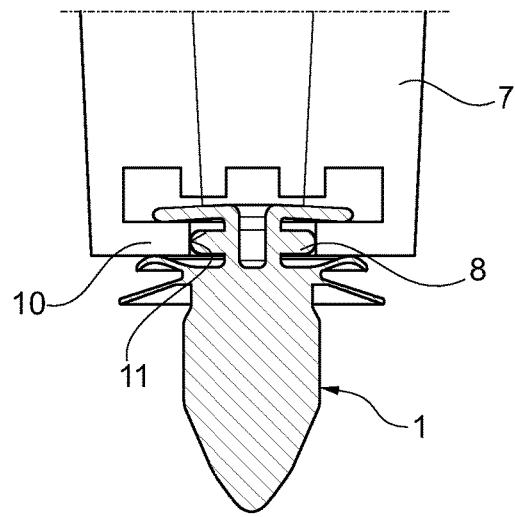
FIG. 3 is a cross-sectional view illustrating the fastening clip.

Reference is now made to FIG. 3, illustrating clearly the way in which the holding part 7 is seated relative to the fastening clip 1. In the illustrated embodiment, the flat portion 10 of the holding part 7 is situated between the outer holding plate 6 and the spacer attachment 4, with the spacer attachment 4 bearing resiliently against the underside of the flat portion 10 of the holding part 7.

Further, in the illustrated embodiment, the elastic ribs 8 are designed to be long enough to extend as far as the inner wall 11 of the holding part 7. This results in the fastening clip 1 being centered elastically relative to the holding part 7 or the covering, and at the same time the fastening clips 1 are fixed to the respective holding part.

Figure 4:
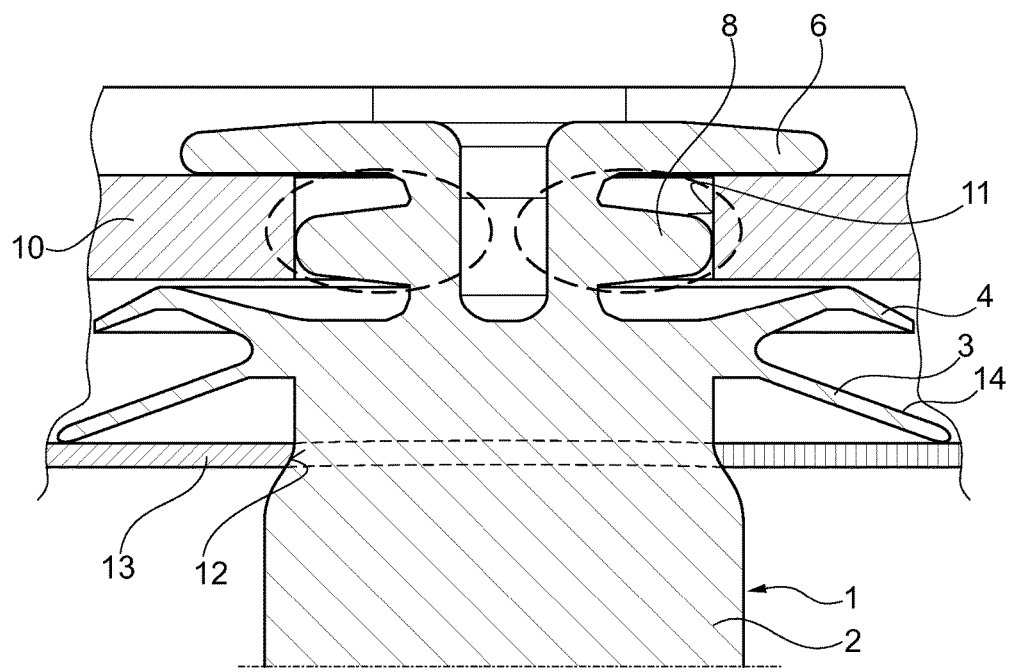
FIG. 4 is an enlarged, detailed cross-sectional view showing the fastening clip pressed into an opening of a body part.

Reference is now made to FIG. 4, illustrating the fastening foot 2 of the clip 1 pressed into an opening 12 of a body part 13. In this fastened state, the inclined edge 14 of the spring plate 3 bears resiliently against the region of the body part 13 that surrounds the opening 12, thereby ensuring that the clip 1 is seated tightly in the body part.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A clip for fastening a covering to a body part of a vehicle, comprising:
    a one-piece plastic part with a fastening foot for pressing into an opening provided in said body part;
    a supporting shaft adjoining the fastening foot and intended for receiving the covering by laterally pushing on a holding part provided on the covering;
    an outer holding plate seated on an outer end of the supporting shaft; and
    elastic ribs extending from a peripheral surface of said supporting shaft adjacent to but without contacting said holding plate;
    wherein the fastening foot defines a width dimension that is greater than a width dimension defined by the elastic ribs, said elastic ribs are at least long enough to extend as far as an inner wall of said holding part, said elastic ribs are integrally formed on said supporting shaft, said elastic ribs project radially from the peripheral surface of said supporting shaft and said elastic ribs comprise four elastic ribs arranged offset by 90° with respect to one another on said peripheral surface of said supporting shaft.

2. The clip of claim 1, wherein said fastening foot is directly adjoined by a spring plate having an inclined edge that bears, in a fastened state of said clip, against a region of said body part surrounding said opening.

3. The clip of claim 2, wherein, in said fastened state of said clip, said inclined edge of said spring plate bears with prestress against said region.

4. The clip of claim 3, wherein a spacer attachment is provided on said supporting shaft between said spring plate and said outer holding plate, a region of said supporting shaft between said outer holding plate and said spacer attachment being provided to receive said holding part of said covering.

5. A clip for fastening a covering to a body part of a vehicle, comprising:
    a one-piece plastic part with a fastening foot for pressing into an opening provided in said body part;
    a supporting shaft adjoining the fastening foot and intended for receiving the covering by laterally pushing on a holding part provided on the covering;
    an outer holding plate seated on an outer end of the supporting shaft; and
    elastic ribs extending from a peripheral surface of said supporting shaft adjacent to but without contacting said holding plate;
    the fastening foot defining a width dimension that is greater than a width dimension defined by the elastic ribs, said elastic ribs are at least long enough to extend as far as an inner wall of said holding part, said elastic ribs are integrally formed on said supporting shaft, said elastic ribs project radially from the peripheral surface of said supporting shaft, and said fastening foot is directly adjoined by a spring plate having an inclined edge that bears, in a fastened state of said clip, against a region of said body part surrounding said opening.

6. The clip of claim 5, wherein, in said fastened state of said clip, said inclined edge of said spring plate bears with prestress against said region.

7. The clip of claim 6, wherein a spacer attachment is provided on said supporting shaft between said spring plate and said outer holding plate, a region of said supporting shaft between said outer holding plate and said spacer attachment being provided to receive said holding part of said covering.

* * * * *